UNITED STATES PATENT OFFICE.

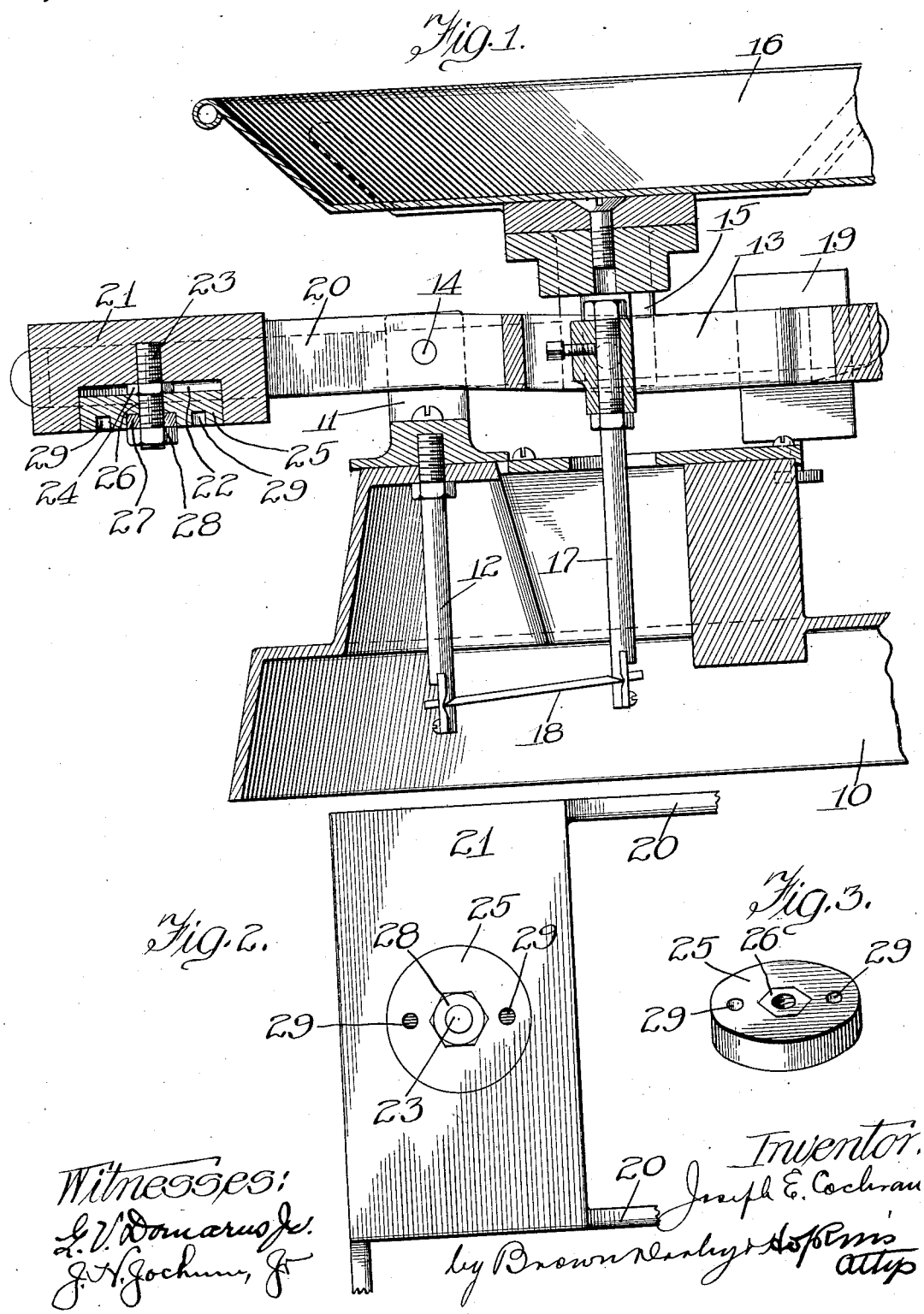

JOSEPH E. COCHRAN, OF CHICAGO, ILLINOIS.

WEIGHING-SCALE.

1,020,744.   Specification of Letters Patent.   Patented Mar. 19, 1912.

Application filed October 22, 1906. Serial No. 339,902.

*To all whom it may concern:*

Be it known that I, JOSEPH E. COCHRAN, a citizen of the United States, residing at Chicago, in the county of Cook and State of Illinois, have invented certain new and useful Improvements in Weighing-Scales, of which the following is a full, clear, and exact specification.

This invention relates to improvements in weighing scales, and more particularly to that class of scales in which is employed a pivoted scale beam; and the primary object of the same is to provide an improved and efficient means whereby the center of gravity of the scale beam may be readily shifted or changed to agree with any change effected in the beam by adding to or subtracting from the weight of the beam, on either side of the pivot.

A further object is to provide an improved and efficient means whereby the center of gravity of the scale beam may be readily shifted or changed, and which means is adjustable transversely with relation to the pivot of the beam.

A further object is to provide an improved device of this character, which will be simple and cheap in construction and efficient in operation.

To the attainment of these ends and the accomplishment of other new and useful objects, as will appear, the invention consists in the features of novelty in the construction, combination and arrangement of the various parts hereinafter more fully described and claimed, and shown in the accompanying drawing, illustrating an exemplification of the invention, and in which—

Figure 1 is a longitudinal sectional view of a portion of a scale constructed in accordance with the principles of this invention; Fig. 2 is a bottom plan view of the counter-balance weight shown in Fig. 1; Fig. 3 is a detail perspective view of the supplemental, or gravity adjusting weight.

In this exemplification of the invention, the numeral 10 designates a base, to which is secured a suitable support 11. Depending from the base 10, preferably in proximity to the support 11, is a bar or member 12. A scale beam 13 has a pivotal bearing 14 in the support 11, preferably adjacent one end of the beam, and pivotally supported by the beam, preferably in advance of its pivot, and by means of a suitable bracket 15, is a platform or scale pan 16. Depending from the platform or scale pan is a rod or member 17 which is parallel with and located in proximity to the rod or member 12. The free end of this rod or member 17 terminates substantially in line with the end of the rod or member 12, and the two ends are connected by a suitable link 18, by means of which the scale pan or platform 16 is always maintained in a horizontal position. A suitable poise 19 is mounted for sliding movement upon the beam 13. All of these parts may be of any suitable construction and form no part of the present invention.

The rear end of the beam 13, preferably projects for some distance beyond the pivot as at 20, and supported by the extremity thereof is a counter-balance weight 21, which may be secured to the beam in any desired manner, preferably by forming the same integral therewith. This counter-balance weight is provided with an open recess 22, located preferably in the lower face and disposed at substantially the center thereof. Secured to the weight 21, and within the recess 22, is a stud 23, which is preferably in the form of a screw, and is secured by one end to the bottom of the recess. The other end projects slightly beyond the face of the weight 21. A stop nut 24 is arranged on the stud 23, and preferably engages the bottom of the recess 22. This recess is preferably cylindrical in form, and is adapted to receive a supplemental weight 25, which latter is provided with a threaded aperture 26, adapted to receive the end of the stud 23. The supplemental weight is of a diameter slightly smaller than the diameter of the recess 22, and is preferably provided with a nut 27 embedded therein, in such a position that its threaded aperture will register with the aperture 26, and with its outer face flush with the outer face of the weight 21. This plemental weight 25 around the nut. The suitable manner, such as by casting the supplemental weigh 25 around the nut. The end of the stud 23 passes through the nut 27 and projects beyond the face thereof, and secured to this projecting end is a retaining nut 28, which is preferably of the same size as the nut 27.

The supplemental weight 25 may be adjusted with relation to the weight 28, by screwing the same on the stud 23, in any suitable manner, preferably by means of a spanner wrench entering the apertures 29, and when adjusted may be held in position by means of the retaining nut 28, which latter engages the nut 27. The nut 27 serves as a bearing for the nut 28 to prevent the latter from wearing the supplemental weight 25. In its normal position, the supplemental weight 25 stands within the recess 22, with its outer face substantially flush with the face of the weight 21, and when it is desired to change or shift the center of gravity of the beam 13 to agree with any change effected in the beam by adding to or subtracting from the weight of the beam, the nut 28 is first loosened, and the supplemental weight 25 adjusted by rotating the same until it has acquired the desired position, after which the nut 28 may be again tightened. The supplemental weight 25 being located beneath the counter-balance weight, is not only out of sight, but is protected, and not in a position to be struck by the user or any article or other object on the counter. Furthermore, by arranging the supplemental weight 25 to be adjusted transversely with relation to the pivot point of the beam, a greater range of adjustment may be obtained without projecting the supplemental weight beyond the counterbalance weight 21, and by having the supplemental weight adjustable up and down with relation to the base of the machine a more accurate and finer adjustment may be obtained.

In order that the invention might be fully understood, the details of an embodiment thereof have been thus specifically described, but

What I claim is:—

1. In a scale, the combination of a pivoted beam, a counterbalancing weight for the beam, a supplemental weight housed within and protected by the first said weight, and means for supporting said supplemental weight for adjustment transversely with relation to the pivot of the beam.

2. In a scale, the combination of a pivoted beam, a counterbalancing weight for the beam, and a supplemental weight housed within the first said weight and adjustable with relation thereto for changing the center of gravity of the beam, said supplemental weight being adjustable with relation to the beam in a transverse direction with relation to the pivot of the beam.

3. In a scale, the combination of a pivoted beam, a counterbalance weight for the beam, said weight being provided with a recess in the lower face thereof, and a supplemental weight adjustably seated in the recess, said supplemental weight being adjustable in a transverse direction with relation to the pivot of the beam and toward and away from the bottom of the recess.

4. In a scale, the combination of a pivoted beam, a counterbalance weight for the beam, said weight being provided with a recess in its lower face, a supplemental weight in said recess, means for adjustably supporting the last said weight, said supplemental weight being adjustable transversely with relation to the pivot of the beam.

5. In a scale, the combination of a pivoted beam, a counterbalancing weight for the beam, said weight being provided with a recess in its lower face, a supplemental weight within the recess, means for supporting the supplemental weight for adjustment transversely with relation to the pivot of the beam, and means for retaining said weight in its adjusted position.

6. In a scale, the combination of a pivoted beam, a counterbalancing weight for the beam provided with a recess in its lower face, a stud within the recess, and a supplemental weight also within the recess and supported by the stud, said weight being adjustable on the stud in a transverse direction with relation to the pivot of the beam.

7. In a scale, the combination of a pivoted beam, a counterbalance weight for the beam provided with a recess in the lower face thereof, a threaded stud within the recess, and a supplemental weight adjustably threaded on the stud, said weight being adjustable in a direction transverse to the pivot of the beam.

8. In a scale, the combination of a pivoted beam, a counterbalance weight for the beam provided with a recess in the lower face thereof, a threaded stud within the recess, a supplemental weight adjustably threaded on the stud, said weight being adjustable in a direction transverse to the pivot of the beam, and means for preventing displacement of the supplemental weight.

9. In a scale, the combination of a pivoted beam, a counterbalance weight for the beam provided with a recess in its lower face, a threaded stud disposed within the recess, a supplemental weight threaded on said stud and adjustable transversely of the pivot of the beam, a wear plate in the supplemental weight, and means adapted to engage said plate for retaining said supplemental weight in position.

10. In a scale, the combination of a pivoted beam, a counterbalance weight for the beam provided with a recess in its lower face, a threaded stud disposed within the recess, a supplemental weight threaded on the stud adapted to be seated in the recess, and adjustable in a direction transverse to the pivot of the beam, a wear plate in the supplemental weight surrounding the stud, and means on the stud adapted to engage the wear plate to retain the supplemental weight in position.

11. In a scale, the combination of a pivoted beam, a counterbalance weight for the beam provided with a recess in its lower face, a threaded stud disposed within the recess, a supplemental weight threaded on the stud and adapted to be seated in the recess, said supplemental weight being adjustable transversely with relation to the pivot of the beam and being provided with wrench seats in one of its faces, a nut embedded in said supplemental weight and surrounding the stud, and a nut on the end of the stud adapted to engage the nut in the weight for retaining the latter in position and for preventing wear upon the said weight by the retaining nut.

In testimony whereof I have signed my name to this specification, in the presence of two subscribing witnesses, on this 19th day of October A. D. 1906.

JOSEPH E. COCHRAN.

Witnesses:
FRANCIS A. HOPKINS,
J. H. JOCHUM, Jr.

Copies of this patent may be obtained for five cents each, by addressing the "Commissioner of Patents, Washington, D. C."